(No Model.)
W. L. SPENCER.
CALF FEEDER.
No. 400,962. Patented Apr. 9, 1889.
Fig. 1.
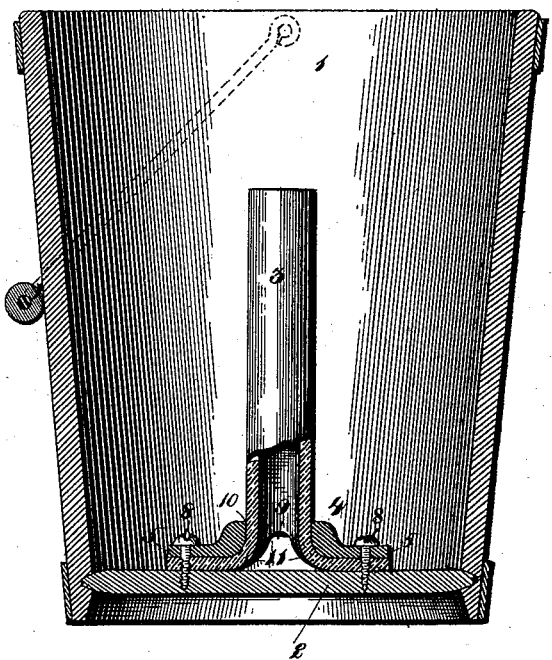
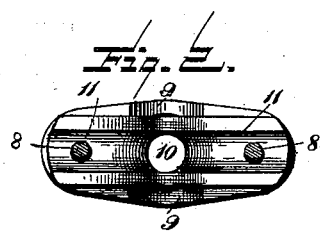
Fig. 2.
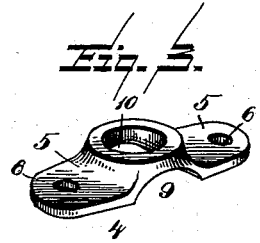
Fig. 3.
Witnesses:
S. C. Hill.
W. S. Duvall.
Inventor:
William L. Spencer.
E. B. Stocking
Attorney.
N. PETERS, Photo-Lithographer, Washington, D. C.

UNITED STATES PATENT OFFICE.

WILLIAM L. SPENCER, OF CLINTON, IOWA.

CALF-FEEDER.

SPECIFICATION forming part of Letters Patent No. 400,962, dated April 9, 1889.

Application filed July 13, 1888. Serial No. 279,851. (No model.)

*To all whom it may concern:*

Be it known that I, WILLIAM L. SPENCER, a citizen of the United States, residing at Clinton, in the county of Clinton, State of Iowa, have invented certain new and useful Improvements in Calf-Feeders, of which the following is a specification, reference being had therein to the accompanying drawings.

This invention has relation to calf-feeders, and among the objects of the invention are to provide an inexpensive simple device adapted to be attached to the bottom of a trough, pail, or other food-receptacle, whereby, in attempting to suck or draw off the food through the same, the nose of the calf will be brought in contact with the food, and thus learn to drink from a pail or other holding device.

Other objects and advantages of the invention will hereinafter appear, and the novel features thereof will be particularly pointed out in the claims.

Referring to the drawings, Figure 1 is a central vertical section of a pail provided with a device constructed in accordance with my invention. Fig. 2 is a bottom plan of the device, and Fig. 3 is a detail in perspective of the arched nipple-plate.

Like numerals of reference indicate like parts in all the figures of the drawings.

1 represents an ordinary pail or bucket, or it may be a feed-trough, to the bottom 2 of which, if the former, I secure a single nipple, 3, or if the latter a series of nipples. The nipples 3 are formed of flexible rubber tubing, and are of a length to extend nearly to the top of the pail.

4 represents an arched nipple-receiving plate, and is formed with the opposite ears 5, perforated, as at 6, for the reception of screws 8, and having an intermediate arched portion, 9, perforated, as at 10, for the passage therethrough of the nipple 3. The nipple is bifurcated or split at its lower end, as at 11, the two separated sides being spread and each passed under the adjacent lug 6 of the nipple-plate, when, by means of the screws 8, which pass through the screw-openings in the lugs and through said bifurcated ends of the nipple, said nipple and plate are secured to the bottom 2 of a pail or trough.

Taking the parts in the position shown in Fig. 1, wherein my invention is applied to a pail or bucket, milk or other liquid food is poured into the bucket until it rises to a point about an inch below the upper end of the nipple. In sucking, the calf's mouth will be brought in contact with the milk, and thus it will learn to drink in preference to sucking. By reason of the arched opening 9 such food as oil-cakes, middlings, &c., may be added to the milk and drawn up through the nipple.

Having described my invention and its operation, what I claim is—

1. In a calf-feeder, a trough or pail, in combination with a nipple formed of flexible tubing and a perforated arched nipple-receiving plate, forming a milk-passage, for securing the same to the bottom of said trough or pail, substantially as specified.

2. The pail 1, having the bottom 2, in combination with the tube 3, bifurcated, as at 11, the nipple-plate 4, arched and perforated, as at 9 and 10, and formed with the ears 5, perforated, as at 6, and the screws 8, substantially as specified.

In testimony whereof I affix my signature in presence of two witnesses.

WILLIAM L. SPENCER.

Witnesses:
CHAS. WHEATON,
M. L. BREWER.